Nov. 28, 1967  D. G. THOMAS  3,355,258
CATALYTIC EXHAUST MUFFLER WITH INTERNAL RESERVOIR
Filed Dec. 4, 1963  3 Sheets-Sheet 1
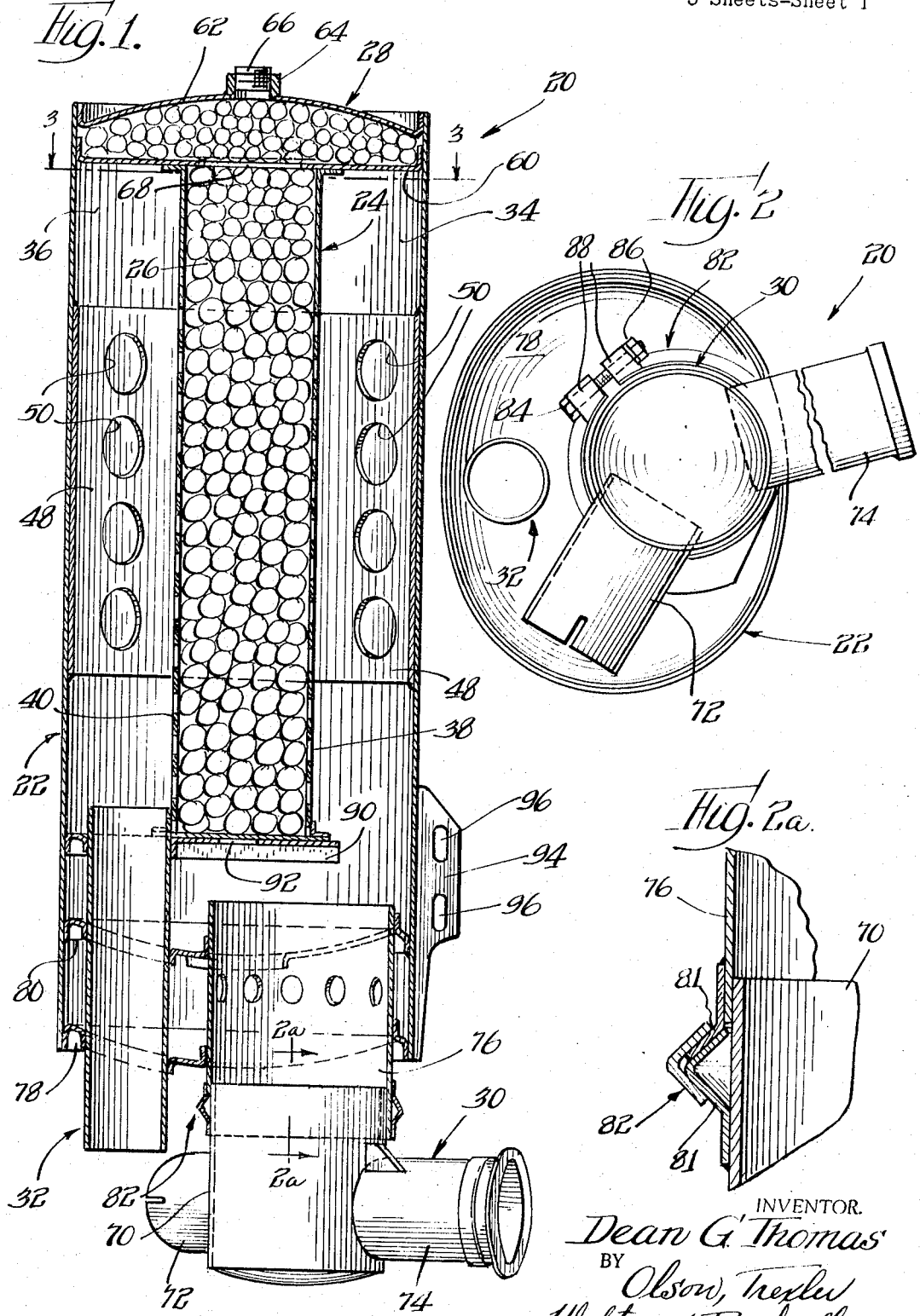
INVENTOR.
Dean G. Thomas
BY Olson, Trexler
Wolters & Bushnell attys

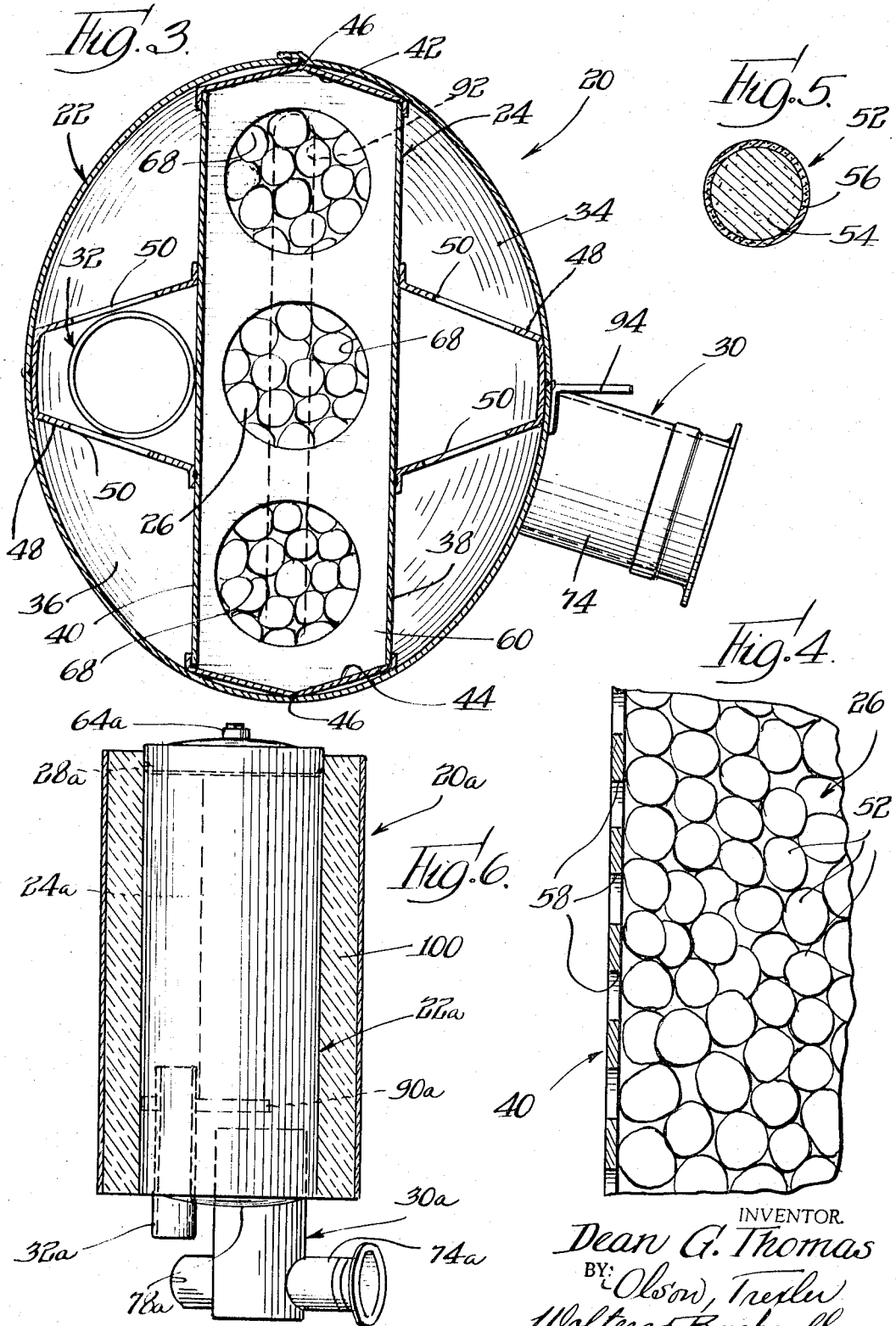

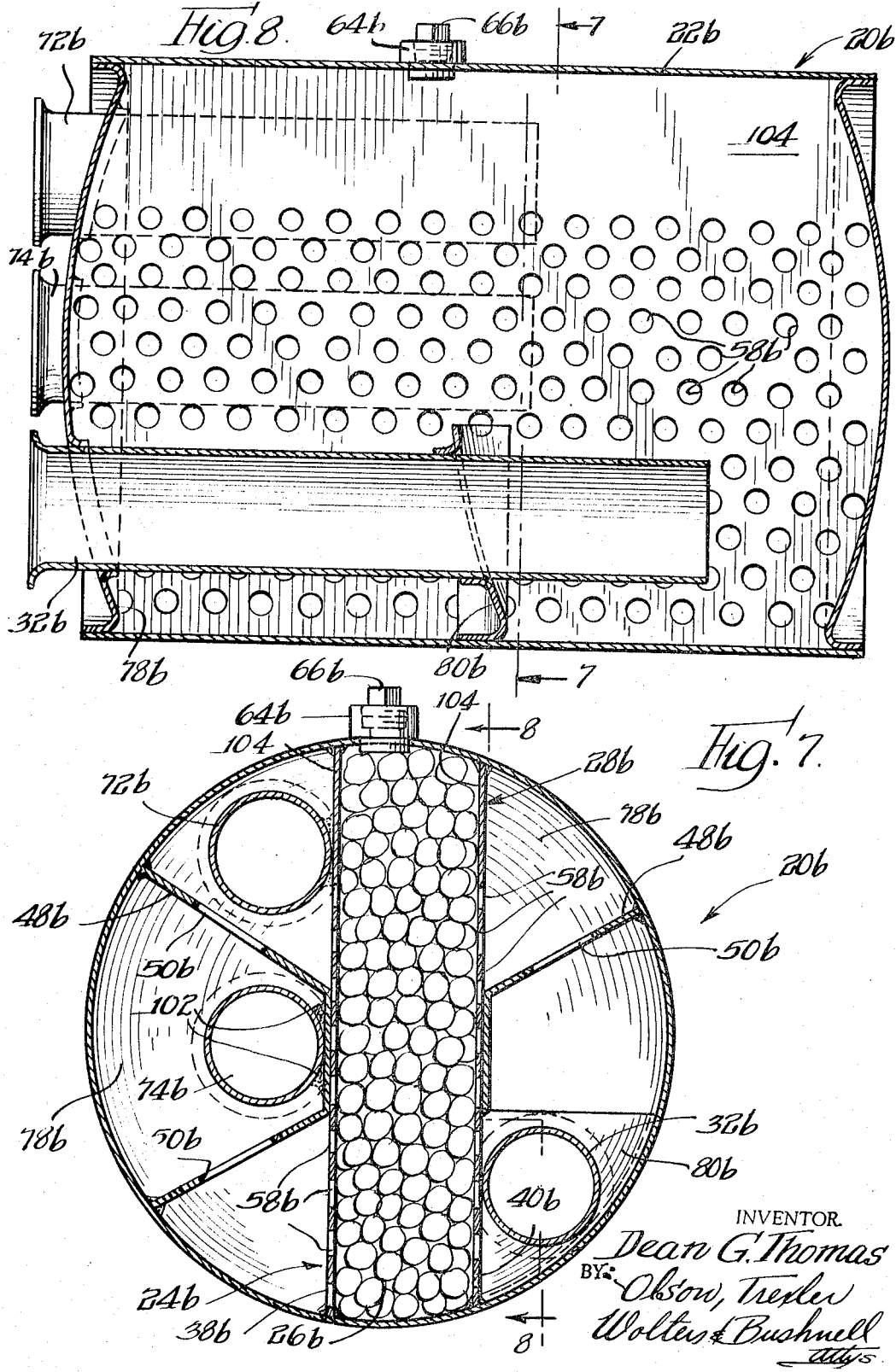

United States Patent Office 3,355,258
Patented Nov. 28, 1967

3,355,258
CATALYTIC EXHAUST MUFFLER WITH
INTERNAL RESERVOIR
Dean G. Thomas, Stoughton, Wis., assignor to Nelson
Muffler Corporation, Stoughton, Wis., a corporation
of Wisconsin
Filed Dec. 4, 1963, Ser. No. 327,907
2 Claims. (Cl. 23—288)

ABSTRACT OF THE DISCLOSURE

An exhaust muffler having a catalyst-retention structure upon which is superposed a catalyst reservoir and which is surrounded by a shell. The retention structure includes spaced walls having gas-passing apertures which cooperate in establishing horizontal flow through the retained bed of catalyst. The shell is spaced from these walls to define separate inlet and outlet gas chambers.

This invention relates generally to exhaust mufflers and more particularly to a muffler of the type that is arranged to eliminate both smoke and objectionable odors from an engine exhaust.

In one specific aspect, the present invention relates to a device for eliminating both smoke and objectionable odors from a diesel emission.

For purposes of distinguishing between the two types of internal combustion engines commonly in use today, as well as for purposes of definition herein, the phrase "diesel engine" is to be understood as referring to a compression-ignition engine which operates with an excess of air in the combustion cycle. In addition, the phrase "Otto cycle engine" is to be understood as referring to a spark-ignition engine which operates with a deficiency of air in the combustion cycle. However, the phrase "diesel engine" is also used herein to refer to a spark-ignition engine which operates normally in a fuel-starved condition and therefore with an excess of air in the combustion stage.

In the past, exhaust mufflers have embodied various catalytic schemes for oxidizing the incompletely combusted emission from Otto cycle engines; and due to the occurrence of carbon monoxide and the occasional presence of unburned gasoline in the emission from engines of this type, it is proved necessary to incorporate means for introducing atmospheric air into the muffler for reaction with the exhaust products. In addition, thermally responsive control means for selectively shunting engine emission past the catalyst have been required to prevent the development of excessive temperatures within the muffler. On the other hand, the emission from diesel cycle engines, while substantially free of carbon monoxide and unburned liquid fuel, contains many objectionable, incompletely oxidized compounds of sulphur and nitrogen. The catalytic mufflers of the prior art have not been arranged for satisfactorily solving the special problems that are encountered with diesel exhausts.

Therefore, an important object of the present invention is to provide a device that is particularly arranged to eliminate undesirable constituents from a diesel engine emission.

Another particular object of the invention is to provide a new and improved catalytic exhaust muffler.

Still another object of the invention is to provide a catalytic exhaust muffler which is arranged for vertical operation.

Yet another object of the invention is to provide an exhaust muffler construction which promotes efficient catalytic activity.

A further object of the invention is to provide an exhaust muffler construction that is arranged to insure passage of exhaust gasses through the catalyst.

A still further object of the invention is to provide a catalytic exhaust muffler which preserves the bed of catalyst in a filled condition.

And a still further object of the invention is to provide a catalytic exhaust muffler which promotes a steady flow of exhaust products through the bed of catalyst.

A yet further object of the invention is to provide a catalytic exhaust muffler which is characterized by low backpressure.

These and other objects and features of the invention will become more apparent from a consideration of the following descriptions.

A device in accord with the invention includes a closed shell having an inlet and an outlet. A foraminous retention unit is mounted in the shell for shaping a bed of catalyst between the inlet and the outlet. A reservoir is connected to the shell in interconnecting relationship with the retention unit, gravitationally overlying the retention unit for supplying supplemental catalyst to the bed thereof. A quantity of flowable catalyst particles are filled into the retention unit to extend into the reservoir, from whence the excess catalyst particles may flow into the bed defined by the retention unit for replenishing the bed and maintaining the same in a filled condition.

In order that the principles of the invention may be readily understood, several embodiments thereof applied to a diesel exhaust muffler, but to which the application is not to be restricted, are shown in the accompanying drawings wherein:

FIG. 1 is an elevational view in cross-section showing a catalytic exhaust muffler embodying certain principles of the present invention;

FIG. 2 is a bottom plan view of the exhaust muffler of FIG. 1, showing the inlet and outlet units emerging from the shell or housing of the muffler;

FIG. 2a is an enlarged sectional view taken along the line 2a—2a of FIG. 1;

FIG. 3 is an enlarged sectional view taken along the line 3—3 of FIG. 1;

FIG. 4 is a further enlarged fragmentary view of the retention unit and the catalyst bed of the muffler of FIG. 1, showing the relationship between the pore size of the perforated walls of the retention unit and the diameter of the catalyst particles;

FIG. 5 is an enlarged sectional view of a catalyst particle for use in the exhaust muffler of FIGS. 1–4;

FIG. 6 is a reduced scale view of a modified embodiment of the exhaust muffler of the invention, particularly arranged with externally applied thermal insulation for use in maintaining the muffler structure at the operating temperature of the catalyst material;

FIG. 7 is a cross-sectional view similar to the showing of FIG. 3 but illustrating a further modified embodiment of the invention wherein the retention unit and a reservoir unit for the catalyst material are arranged to have common walls, FIG. 7 being a view taken substantially along the line 7—7 of FIG. 8; and FIG. 8 is a side elevational view taken in cross-section along the line 8—8 of FIG. 7.

Referring now in detail to the drawings, specifically to FIGS. 1–3, a catalytic exhaust muffler of the type which is arranged both for exhaust control and muffling will be seen indicated generally by the numeral 20. The muffler 20 includes a tubular shell or housing 22, a retention unit 24 which is adapted to contain and shape a bed of catalyst material 26 within the shell 22, a reservoir unit 28 for supplying supplemental catalyst to the bed that is defined by retention unit 24, an inlet device 30, and a tubular, vertically disposed outlet member 32.

The tubular shell 22 is fashioned to take a cross-sectional shape that is generally oval; and the retention unit 24 is arranged to be of generally rectangular shape, the retention unit being selected to take a transverse dimension which adapts it for spanning the major diameter of the oval, tubular shell 22. In addition, the dimension of the retention unit 24 which corresponds with the minor diameter of the shell 22 is selected to be substantially less than the minor diameter of the shell so that the retention unit and the shell may cooperate in defining open regions 34 and 36 on the opposite sides of the retention unit. The open regions 34 and 36 form principal portions respectively of an inlet and an outlet chamber as will be brought out more fully hereinafter.

With reference to FIG. 1, the exhaust muffler 20 is seen to be adapted for use with the tubular shell 22 disposed in generally upright position and with the retention unit 24 generally bisecting the shell 22 vertically. This disposition of the muffler 20 and the generally oval shape of the tubular shell 22 are elements of convenience for particular situations of use. Furthermore, it is to be observed that the muffler 20 is arranged for flow of the exhaust gases horizontally from the open region 34 laterally through the retention unit 24 and thence into the open region 36. While this flow path has proved to be of substantial utility, the flow of gases through the retention unit 24 may also be directed vertically through a horizontally disposed retention unit and either in an upward or downward direction as is desired.

The retention unit 24 comprises spaced, parallel disposed plates or walls 38 and 40 which are fabricated to be of foraminous nature in order to facilitate passage of exhaust gases therethrough; and the foraminous plates or walls 38 and 40 may be manufactured from either perforated metal or coarse mesh screen for example. The plates 38 and 40 are closed laterally by side plates 42 and 44, shown in FIG. 3, the plates 42 and 44 being longitudinally deflected for attachment to the shell 22 as by weldments 46. The side plates 42 and 44 cooperate with the weldments 46 in sealing the open region 34 from the open region 36 so as to insure passage of exhaust gases through the retention unit 24. In order to support the foraminous walls 38 and 40 within the shell 22, tubular brackets 48 are attached to the inside of shell 22 and to the outside of the respective foraminous walls. The brackets 48 are arranged to take generally trapezoidal section and are perforated with relatively large diameter holes 50, according to the showing of FIGS. 1 and 3. The holes 50 promote free movement of the exhaust gases within the respective open regions 34 and 36 and generally reduce the weight of the brackets 48. The trapezoidal shape of the brackets develops desirable rigidity in the muffler structure; and the brackets thermselves together with the openings formed therein provide a certain baffling effect within the open regions 34 and 36.

The brackets 48 have been described as being affixed to the outside surface of the foraminous walls 38 and 40; and when so arranged, the spaced walls 38 and 40 are able to define a substantially unobstructed space for receiving and shaping a bed of catalyst between the open regions 34 and 36. This arrangement of the brackets 48 externally of the retention unit 24 proceeds in accordance with a feature of the invention, namely that no bracing elements or the like be located within the bed of catalyst material 26. It has been found that a pelletized catalyst of a fluid nature tends to form channels or pockets adjacent bracing elements or other physical obstructions that are disposed traversing a bed of such material whereby to encourage undesirable, preferential gas flow through such pockets or channels. Any such bypassing of the catalyst bed greatly reduces the effectiveness of the catalyst action.

The catalyst material 26 is of particulate nature; and suitable catalyst materials are composed of an oxidation catalyst deposited on a particulate support. While the physical shape of the catalyst particles may be spherical, cylindrical, rhombohedral or irregular, generally spherical particles have proved to be simplest to manufacture, a generaly spherical catalyst particle 52 being illustrated in FIG. 5. Each particle 52 comprises a substantially spherical support 54 which is coated with an oxidation catalyst 56. The support 54 may be selected from inorganic refractory oxides, such as alumina, silica or combinations thereof or calcined forms of diatomaceous earth, pumice and kieselguhr. The oxidation catalyst 56 may be selected from either the metals of groups I, V, VI and VIII of the Periodic Table or the oxides of such metals, as for example vanadium, chromium, platinum and nickel.

It has been found that, when the foraminous plates 38 and 40 are fabricated with pores of extremely small diameter, on the order of $\frac{1}{16}$ of an inch or less, there is a pronounced tendency toward clogging of the pores by the catalyst particles, particularly when the muffler 20 is employed for controlling a diesel emission. Considering FIG. 4 and in accordance with a feature of the invention, the pores 58 that are fashioned in the plates 38 and 40 are selected to take a diameter of at least about $\frac{3}{32}$ of an inch and preferably between $\frac{1}{8}$ and $\frac{3}{16}$ of an inch. Correspondingly, the catalyst particles 52 are fabricated to have a mean diameter, when initially charged into the muffler, of about twice the pore size of the foraminous plates 38 and 40. When the foraminous plates and the catalyst particles are so arranged, there is little clogging of the pores in the foraminous plates, catalyst loss through attrition is substantially reduced, and the backpressure of the muffler, that is, the resistance to flow of the exhaust gases, is relatively low.

In accordance with another feature of the invention, the muffler 20 is arranged to preserve the bed of catalyst material 26 in a filled condition, specifically by the provision of the reservoir unit 28. The reservoir unit 28 is disposed in a gravitationally superior position relative to the retention unit 24 and in communication therewith. Furthermore, the reservoir unit 28 is filled with supplemental quantities of the catalyst particles 52 so that, when any of the catalyst particles in the retention unit are dissipaed through powdering, thermal breakdown or frictional effects, replacement particles will fall from the reservoir unit 28 into the retention unit 24 under the influence of gravity. With reference to FIG. 1, the reservoir unit 28 comprises a lower plate 60 which is secured to the flanged, upper end of plates 38 and 40, the reservoir unit additionally including a domed upper plate 62 which is spaced vertically from the plate 60 to define a cavity therebetween for receiving suitable quantities of the catalyst particles. The domed plate 62 is provided with a threaded, central collar 64 which acts as a filler opening, the collar 64 being internally threaded to receive a cooperatively threaded plug 66 as a closure element. According to the showing of FIG. 3, the lower plate 60 is perforated with three circular openings 68 that are adapted to pass the catalyst particles from the reservoir unit 28 into the retention unit 24. It is to be recognized that the gravitational feeding of supplemental catalyst particles eliminates the need for springs and other drive mechanisms in replenishing the catalyst bed in the retention unit while, at the same time, insuring that the catalyst bed will remain in a filled condition.

The bed of catalyst material 26 serves to muffle or attenuate the mechanical energy waves or noise that accompany the engine emission. The perforated brackets 48 cooperate in furthering this muffling action.

With further reference to FIG. 1 and with supplemental reference to FIG. 2, the inlet device 30 is seen to comprise a tubular manifold 70 which forms a confluence for two inlet tubes 72 and 74. A single large inlet tube would, of course, serve equally well. A vertical pipe 76 is disposed coaxially with the manifold 70 and is arranged to take approximately the same diameter so as to lead the exhaust gases from the manifold in an easy manner.

The pipe 76 is mounted in the bottom end of shell 22 by an end plate 78 and by an intermediate plate 80. The plates 78 and 80 are also appropriately perforated and flanged for use in attaching and supporting the tubular outlet member 32.

With reference to FIG. 2a, the confronting ends of manifold 70 and pipe 76 are provided with meshing, radial enlargements 81, and a clamp 82 is employed in holding these radial enlargements in meshed engagement. As is well illustrated in FIG. 2, a bolt 84, a nut 86 and spaced ears 88 are incorporated in the clamp 82 for releasably tightening the same. By so connecting the manifold 70, it is easy to separate the inlet tubes 72 and 74 from the shell 22 without disturbing the exhaust connections with the engine. Easy separation of the shell 22 from the inlet tubes 72 and 74 is a particular advantage when it is desired to replace a worn out or damaged muffler.

In compliance with an important feature of the invention, means are provided for transmitting heat from the inlet gases to the catalyst particles in the retention unit 24 in order to raise the catalyst particles rapidly to the operating temperature of the catalyst. Considering FIG. 1, a heat transfer plate 90 is generally aligned with the pipe 76 so as to have at least a portion of the hot exhaust stream impinge thereon. The plate 90 is fabricated from a thermally conductive material and is secured to the lower end of retention unit 24 for receiving heat from the hot exhaust stream and for transferring the received heat to the catalyst particles in the bottom of the retention unit. It is to be recognized that, upon start-up of the muffler 20, the first exhaust gases entering the muffler 20 heat the plate 90 and thereby the adjacent catalyst particles. These heated catalyst particles then act to encourage oxidation of various products in the exhaust stream; and since this oxidation process is exothermic, additional heat is generated and is transferred gradually to the remaining catalyst particles in the retention unit. These subsequently heated catalyst particles act to encourage oxidation of the unburned products in the exhaust stream upon reaching the operating temperature.

The plate 90 is advantageously secured to the tubular outlet member 32 and to a portion of the shell 22, plate 90 being spaced from the shell 22 adjacent the pipe 76 so as to cooperate in defining an inlet chamber communicating the pipe 76 with the open region 34. Cooperatively, the inner end of pipe 76 is displaced axially from the plate 90 in furtherance of the development of an inlet chamber. If desired, the plate 90 may be fashioned with an elongated slot 92 to be used in welding the plate 90 to the floor panel of the retention unit 24. Moreover, it will be noted that the diameter and therefore the orifice size of the pipe 76 is substantially greater than the diameter and therefore the orifice size of the outlet member 32, whereby to reduce the turbulence in the exhaust gases entering the muffler 20. If desired, an external mounting bracket 94 may be affixed to the outside of shell 22 to be provided with bolt holes 96 for use in fastening the muffler 20 to an adjacent structure.

When the muffler 20 is intended for use in eliminating smoke and odor from the emission of a diesel engine, the shell 22 is closed to the atmosphere except for the inlet device 30 and the outlet member 32, there being no need for supplying auxiliary air to the muffler for the catalytic oxidation of unburned ingredients of the injected fuel. The need for auxiliary air is eliminated in such instance because diesel engines normally operate with excess air in the combustion stage. A diesel emission is also substantially free of carbon monoxide for the same reason. Late in the combustion cycle, after the products of combustion have left the combustion chamber, compounds of sulphur and nitrogen remain; and these compounds, to a large degree, are the cause of the odors so noticeable in the typical diesel engine exhaust. They do not reconstitute themselves after leaving the engine unless they are exposed to a proper catalyst, which, in combination with the required excess air and acceptable temperature conditions, further alters them to a point where they no longer manifest the objectionable odors. Smoke (minute particles of free carbon) is also caused to unite with the oxygen in the same manner and thus becomes colorless and odorless carbon dioxide. It is thus apparent that when muffler 20 is to be used for controlling a diesel emission, there is no need for a thermally controlled shunting valve to bypass the emission should the catalyst bed exceed a safe temperature. In addition, the various components of the muffler 20 may be fabricated from aluminized or plain carbon steels when control of a diesel emission is contemplated; but if the muffler 20 is to be used for controlling the emission from an Otto cycle engine, 300 Series stainless steels or other high heat resistant alloys should be employed.

Operation and use of the muffler 20 will be apparent from the above descriptions.

While the particular embodiment of the invention has been thus far shown and described, it should be understood, of course, that the invention is not limited thereto since many modifications may be made. Therefore and in order to enhance the understanding of the invention, modified embodiments thereof are shown in FIG. 6 and FIGS. 7 and 8. Since the modified embodiments incorporate certain elements which are similar to those found in the embodiment of FIGS. 1–5, like numerals have been used to designate like parts with the suffix letter a being employed to distinguish those elements associated with the embodiment of FIG. 6 and with the suffix letter b being utilized to indicate those elements associated with the embodiment of FIGS. 7 and 8.

The muffler 20a which is shown in FIG. 6 is particularly characterized by the lagging or covering of the shell 22a with a suitably encased, encompassing layer 100 of thermal insulation, for example, asbestos or magnesia. This layer of insulation maintains the heat within the unit and reduces heat loss from the bed of catalyst material. The inlet device 30a may also be lagged or coated with thermal insulation for further preserving the heat contained in the engine emission.

The muffler 20b which is shown in FIGS. 7 and 8, on the other hand, is characterized by its arrangement for horizontal installation and by fabrication of the retention unit 24b and the reservoir unit 28b to possess common walls. Specifically, the outlet member 32b and the inlet tubes 72b and 74b are situated in horizontal disposition as is well illustrated in FIG. 8. Moreover, transfer of heat from the incoming exhaust stream to the bed of catalyst material 26b is achieved by attaching one or both of the inlet tubes to a wall of the retention unit 24b. In specific compliance with the features of the embodiment illustrated in FIGS. 7 and 8, inlet tube 74b is secured to a bracket 48b by weldments 102, bracket 48b being intimately secured, in turn, to the wall 38b of retention unit 24b. The interconnection of inlet tube 74b, bracket 48b and plate 38b provides the desired thermal communication between the incoming exhaust stream and the bed of catalyst material 26b.

In compliance with another feature embodied in muffler 20b, the plates 38b and 40b include confronting upper portions 104 which are imperforate in character in order that they may define the reservoir unit 28b the upper portions 104 merging integrally with the lower portions of the plates 38b and 40b which are, of course, perforated with the pores 58b in order to transmit exhaust gases through the bed of catalyst material 26b.

If desired, inlet tube 72b may be attached to the imperforate portion 104 and plate 38b in thermal communication therewith as a means of transferring heat from the incoming engine emission to the catalyst particles.

The muffler 20b, like the muffler 29, is particularly arranged to avoid bracing or other structural elements within the retention unit 24b whereby to prevent the development of channels or cavities in the bed.

The specific examples herein shown and described are to be considered as being primarily illustrative. Various changes beyond those described will, no doubt, occur to those skilled in the art; and such changes are to be understood as forming a part of this invention insofar as they fall within the true spirit and scope of the appended claims.

The invention is claimed as follows:

1. A muffling device for controlling an engine emission comprising: retention means for a particulate catalyst, said retention means including laterally spaced, substantially vertical planar walls of substantial height and having gas-passing apertures therein whereby to cooperate in establishing horizontal flow through said retention means; shell means surrounding said retention means and spaced apart from the faces of said walls to define separate inlet and outlet gas chambers; mounting means attaching said walls to said shell means and cooperating to isolate said chambers from each other; and reservoir means superposed on said retention means and having relatively large opening means communicating with said retention means for free movement of catalyst.

2. A muffling device according to claim 1 wherein said mounting means includes brace elements disposed between said walls and said shell means outside of the space between said walls.

References Cited
UNITED STATES PATENTS

| | | | |
|---|---|---|---|
| 1,893,372 | 1/1933 | Kryzanowsky | 23—288 |
| 2,025,140 | 12/1935 | Wenzel. | |
| 2,747,976 | 5/1956 | Houdry | 23—288 |
| 2,846,021 | 8/1958 | Encinas. | |
| 2,911,289 | 11/1959 | Forry. | |
| 3,024,593 | 3/1962 | Houdry. | |
| 3,090,676 | 5/1963 | Johnson | 23—288 |
| 3,169,836 | 2/1965 | Davis | 23—288 |
| 3,215,507 | 11/1965 | Horstmann et al. | 23—288 |
| 3,290,121 | 12/1966 | Malkiewicz | 23—288 |

FOREIGN PATENTS 439,766  12/1935  Great Britain.

JOSEPH SCOVRONEK, *Primary Examiner.*